United States Patent [19]

Yamaguchi

[11] Patent Number: 5,390,058
[45] Date of Patent: Feb. 14, 1995

[54] MAGNETIC HEAD ASSEMBLY WITH SPRING ARMS HELD ON ONE SIDE OF HEAD ARM

[75] Inventor: Akihiko Yamaguchi, Higashine, Japan

[73] Assignee: Fujitsu Limited, Japan

[21] Appl. No.: 19,760

[22] Filed: Feb. 19, 1993

[30] Foreign Application Priority Data

Feb. 26, 1992 [JP] Japan .................................. 4-039297

[51] Int. Cl.[6] .......................... G11B 5/48; G11B 21/16
[52] U.S. Cl. .................................................. 360/104
[58] Field of Search ............................... 360/103–105, 360/107

[56] References Cited

U.S. PATENT DOCUMENTS

| 4,829,395 | 5/1989 | Coon et al. | 360/104 |
| 5,003,420 | 3/1991 | Hinlein | 360/104 |
| 5,153,794 | 10/1992 | Hinlein | 360/104 |
| 5,172,286 | 12/1992 | Jurgenson | 360/104 |
| 5,185,683 | 2/1993 | Oberg et al. | 360/104 |
| 5,187,626 | 2/1993 | Hopkins et al. | 360/104 |
| 5,237,475 | 8/1993 | Kazama et al. | 360/104 |
| 5,291,360 | 3/1994 | Foote | 360/104 |

FOREIGN PATENT DOCUMENTS 62-298012  12/1987  Japan .................................. 360/104
2097171    10/1982  United Kingdom .

Primary Examiner—John H. Wolff
Attorney, Agent, or Firm—Greer, Burns & Crain, Ltd.

[57] ABSTRACT

A magnetic head assembly in a magnetic disk apparatus comprising a plurality of coaxially arranged magnetic disks; the magnetic head assembly being inserted in a gap between the adjacent magnetic disks so that one magnetic head has access to the lower surface of the upper magnetic disk and the other magnetic head has access to the upper surface of the lower magnetic disk. Head arms extend from an actuator spindle and two spring arms support each of the head arms for elastically carrying the magnetic heads. A holder holds two spring arms together between the head arm and the holder and has cylindrical engaging portion extending through apertures of the spring arms and is received in a hole of the head arm; the cylindrical engaging portion being permanently deformed so as to bite into the head arm and fix the holder to the head arm.

8 Claims, 6 Drawing Sheets

MAGNETIC HEAD ASSEMBLY WITH SPRING ARMS HELD ON ONE SIDE OF HEAD ARM

BACKGROUND OF THE INVENTION

1. Field of the Invention

The present invention relates to a magnetic head assembly in a magnetic disk apparatus.

2. Description of the Related Art

A magnetic disk apparatus comprises a plurality of coaxially arranged magnetic disk and a plurality of magnetic head assemblies operating in cooperation with the magnetic disks. Each magnetic head assembly includes two magnetic heads inserted in a gap between the adjacent magnetic disks, with one magnetic head having access to the lower surface of the upper magnetic disk and the other magnetic head having access to the upper surface of the lower magnetic disk. The magnetic heads are carried by spring arms, respectively and a pair of spring arms are in turn supported by a rigid head arm that is mounted on an actuator spindle. The actuator spindle can be rotated to move the head arm and the spring arms so that the magnetic heads move generally radially of the magnetic disks, i.e., across the tracks of the magnetic disks.

There are two known methods of mounting two spring arms to the head arm. In the first method, one spring arm is attached to the upper surface of the head arm and the other spring arm is attached to the lower surface of the head arm; and in the second method, two spring arms are attached together to the upper surface of the head arm. These features are described in, for example, Japanese Unexamined Patent Publication (Kokai) No. 2-235272, No. 3-144978 and No. 4-137284. In these prior arts, two spring arms are fixed to the head arm by screws.

In contemporary magnetic disk apparatuses, there is a demand for the gap between the adjacent magnetic disks to be reduced as small as possible so as to increase the number of the magnetic disks equipped in the apparatus. It is believed that it is possible to reduce the gap between the adjacent magnetic disks according to the above described second method. However, there are problems in the-prior art, which uses screws to attach two spring arms to the head arm in that it is difficult to tighten the screws in the gap between the adjacent magnetic disks. It is also difficult to automatically assemble the magnetic head assemblies using screws.

Japanese Unexamined Utility Model Publication (Kokai) No. 64-12267 discloses a magnetic disk apparatus in which supporting elements are fixed to the spring arms, respectively. One supporting element is engaged in a hole provided in the head arm from one side thereof with an associated spring arm located on the outside of the supporting element and the other supporting element is engaged in a hole provided in the head arm from the other side thereof with an associated spring arm located on the outside of the supporting element. Press means are then forcibly inserted in the supporting elements thereby causing the supporting element to be permanently deformed so as to bite in the head arm.

This prior art does not use screws for fixing two spring arms to the head arm. However, this prior art does not satisfy a demand that the gap between the adjacent magnetic disks be reduced as small as possible, as this relates to the above described first method and because the supporting elements increase the thickness of the magnetic head assembly.

SUMMARY OF THE INVENTION

An object of the present invention is to provide a magnetic head assembly by which a gap between adjacent magnetic disks in a magnetic disk apparatus can be reduced.

Another object of the present invention is to provide a magnetic head assembly in which two spring arms are fixed to a head arm by means of a fixing means other than screws.

According to the present invention, there is provided a magnetic head assembly in a magnetic disk apparatus comprising a plurality of coaxially arranged magnetic disks; one of the adjacent magnetic disks having a first surface and the other disk having a second surface facing the first surface; said magnetic head assembly comprising first and second magnetic heads; and a first spring arm having first and second opposite end portions; the first spring arm carrying, at the first end portion thereof, the first magnetic head for access to the first surface of one of the magnetic disks; a second spring arm having first and second opposite end portions; the second spring arm carrying, at the first end portion thereof, the second magnetic head for access to the second surface of the other magnetic disk; a head arm extending from a rotatable support structure into a gap between the adjacent magnetic disks so as to support the first and second spring arms for radial movement relative to the magnetic disks, and a unitary holder for holding the second end portions of the first and second spring arms together between one side of the head arm and the holder; the holder having an engaging portion extending through the first and second spring arms and contacting the head arm; the engaging portion being permanently deformed to bite into the head arm and fix the holder to the head arm.

Preferably, the holder comprises a flat plate portion and at least one cylindrical engaging portion extending perpendicularly from the flat plate portion; the first and second spring arms having apertures for passage of the cylindrical engaging portion; the head arm having a hole delimited by a cylindrical inner wall, whereby the cylindrical engaging portion of the holder is inserted through the apertures of the first and second spring arms received in the hole of the head arm, and permanently deformed to bite into the cylindrical inner wall of the head arm. In this case, preferably, the cylindrical engaging portion has a bore having an inner diameter, and the cylindrical engaging portion is permanently deformed by forcibly inserting a rigid ball having a diameter slightly larger than the inner diameter of the bore of the cylindrical engaging portion, through the internal hole of the cylindrical engaging portion to create permanent deformation to the cylindrical engaging portion.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 3:
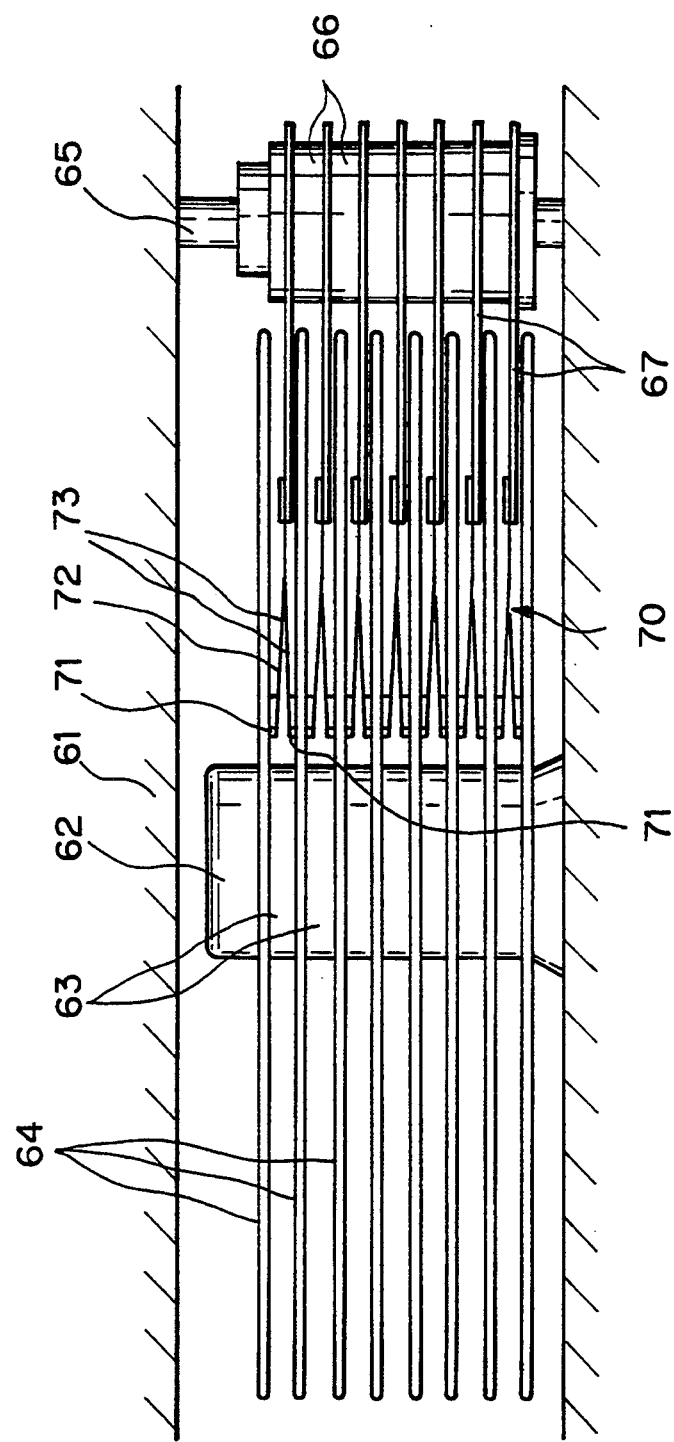
FIG. 3 is a diagrammatic vertical cross-sectional view of a magnetic disk apparatus.
Figure 4:
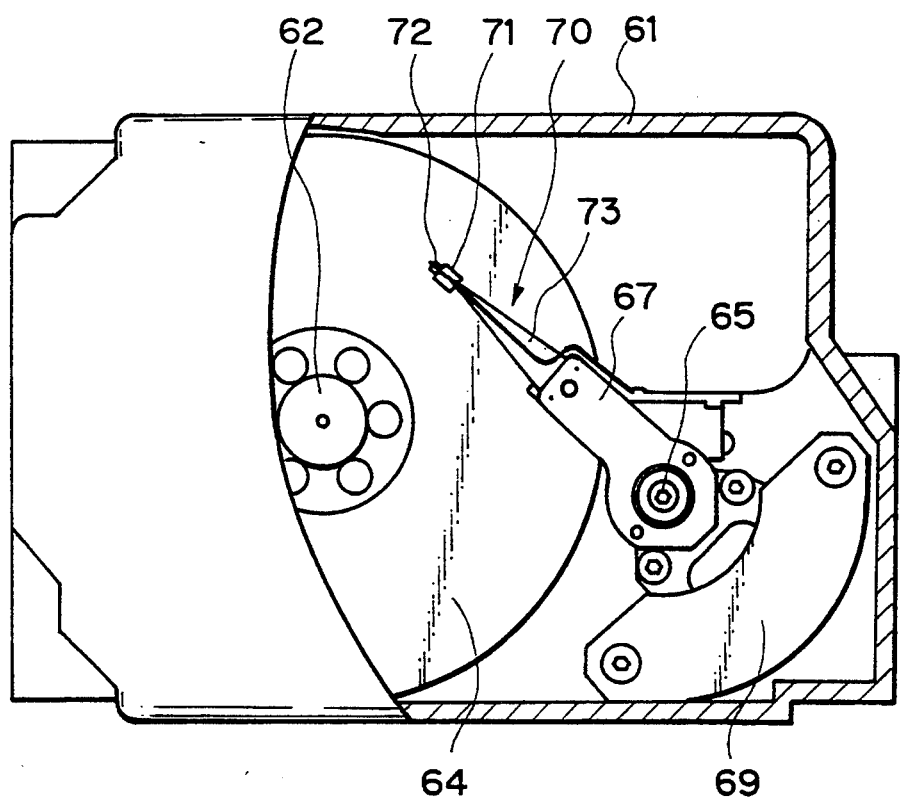
FIG. 4 is a partially enlarged horizontal cross-sectional view of the magnetic disk apparatus of FIG. 3.
Figure 5:
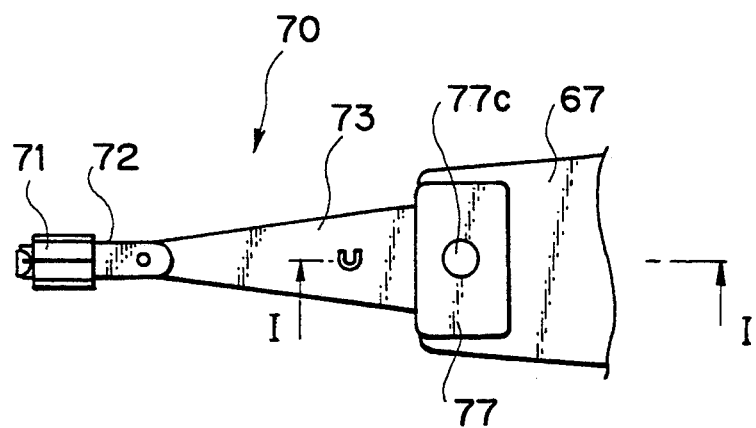
FIG. 5 is a plan view of the magnetic assembly of FIGS. 1 to 4.
Figure 6:
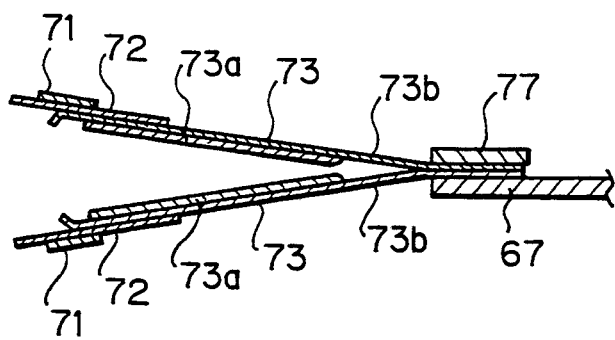
FIG. 6 is a side view of the magnetic assembly of FIG. 5.

Referring to FIGS. 3 and 4, the magnetic disk apparatus comprises an enclosure 61 that seals and accommodates elements of the magnetic disk apparatus. The magnetic disk apparatus includes a plurality of (eight in the embodiment) magnetic disk 64 mounted on a spindle shaft 62 and spaced at a gap by spacers 63. The spindle shaft 62 is driven by a spindle motor (not shown) at 3600 rpm.

The magnetic disk apparatus also includes an actuator shaft 65 parallel to the spindle shaft 62 and carrying a plurality of (seven in the embodiment) head arms 67 and spaced by spacers 66. Each of the head arms 67 extends into a gap between the adjacent magnetic disks 64 and forms a part of a magnetic disk assembly 70. The actuator shaft 65 is driven by an actuator motor 69 comprising a moving coil type force motor including a stationary magnetic circuit member and a coil mounted to the actuator shaft 65 and inserted in a magnetic gap of the magnetic circuit member.

The magnetic disk assembly 70 comprises the head arm 67 extending from the rotatable actuator shaft 65, two spring arms 73, and two magnetic heads 71 carried by the two spring arms 73 via gimbal springs 72, respectively. As is well known, the magnetic heads 71 have magnetic gaps, respectively, and the upper magnetic head 71 is directed to the lower surface of the upper magnetic disk 64, and the lower magnetic head 71 is directed to the upper surface of the lower magnetic disk 64 to read-write data in the magnetic disks 64.

Referring to FIGS. 1, 2, 5 and 6, each of the spring arms 73 is a leaf spring having side flaps 73a extending from the free end thereof to its midway so as to increase the rigidity of the spring arm 73 so that elasticity is provided only in a region where side flaps 73a are not provided. Each of the spring arms 73 has a slightly bent portion 73b in the elastic region so that two spring arms 73 diverge toward the free end thereof. The gimbal springs 72 are more flexible than the spring arms 73 so that the magnetic heads 71 can follow the surfaces of the moving magnetic disks 64.

Figure 1:
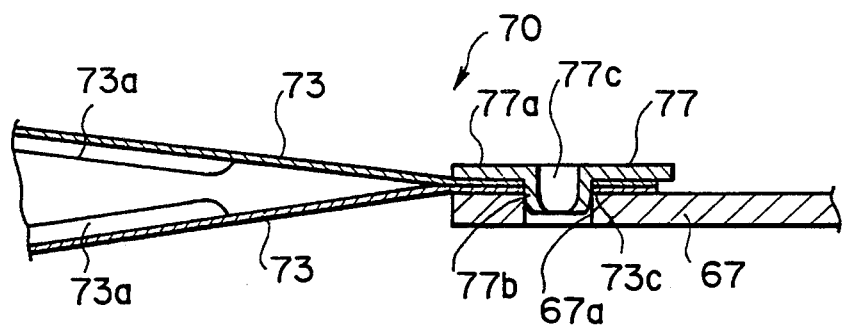
FIG. 1 is a cross-sectional view of a part of a magnetic head assembly according to the first embodiment of the present invention before the holder is deformed, and taken along the line I—I in FIG. 5.
Figure 2:
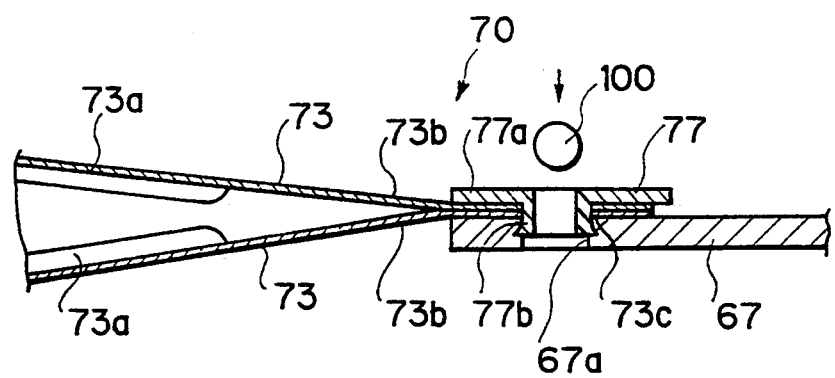
FIG. 2 is a cross-sectional view of the magnetic head assembly of FIG. 1, after the holder is deformed.

As shown in FIGS. 1 and 2, the spring arms 73 are attached together to the head arm 67 in a overlapping relationship. Each of the spring arms 73 has at the proximal end portion thereof an aperture 73c. The head arm 67 has a hole 67a having a shape identical to the aperture 73c.

A holder 77 is placed on the piled spring arms 73 for holding the proximal portions of the first and second spring arms 73 together between the head arm 67 and the holder 77. The holder 77 comprises a flat plate portion 77a and a cylindrical engaging portion 77b extending perpendicularly from the flat plate portion 77a. The cylindrical engaging portion 77b is adapted to fit in the apertures 73c in the spring arms 73 and the hole 67a in the head arm 67.

The cylindrical engaging portion 77b has a bore 77c having an inner diameter. The lower end of the cylindrical engaging portion 77b is slightly converged, and when the magnetic head assembly 70 is assembled as shown in FIG. 1, the cylindrical engaging portion 77b is permanently deformed so as to bite into the cylindrical inner wall of the hole 67a of the head arm 67 and fix the holder 77 to the head arm 67, as shown in FIG. 2, which is carried out by forcibly inserting a steel ball 100 having a diameter slightly larger than the inner diameter of the bore 77c of the cylindrical engaging portion 77b. In particular, the steel ball 100 can be continuously forced in the bores 77c of the holders 77 of the aligned magnetic head assemblies 70, as shown in FIG. 3. It will be possible to connect the spring arms 73 to the holder 77 by an appropriate means such as a spot welding prior to fixing the holder 77 to the head arm 67.

During the operation of the magnetic disk apparatus, the spindle shaft 62 with the magnetic disks 64 is driven at 3600 rpm, and when an electric current flows to the coil of the actuator motor 69 under the control of the control means (not shown), the coil moves relative to the magnetic circuit member and the actuator shaft 65 with the head arms 67 rotating. The head arms 67 move across the tracks on the surfaces of the magnetic disk 64 so as to transport the magnetic heads 71 to a desired track. The magnetic heads 71 carry out the read-write of data in the magnetic disks 64.

It is possible to reduce the gap between the adjacent magnetic disks 64 in the above described arrangement of the present invention. Also, two spring arms 73 are fixed to the head arm 67 by means of a permanently deformed wall of the holder 77, i.e., without the use of screws, and accordingly, it is possible to facilitate the assembly work and thus enabling an automatic assembly operation. In addition, the omission of screws eliminates the possibility of filings accumulating particles that are generated during the screw threading operation.

Figure 7:
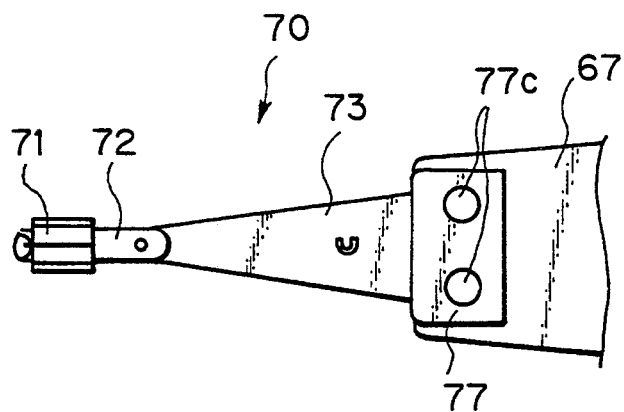
FIG. 7 is a plan view of the magnetic assembly according to the second embodiment.

FIG. 7 shows the magnetic assembly 70 according to the second embodiment of the present invention. This embodiment includes elements identical to those of the previous embodiment, except that the holder 77 has two bores 77c, which means that the holder 77 has two cylindrical engaging portions 77b with respective bores 77c.

Figure 8:
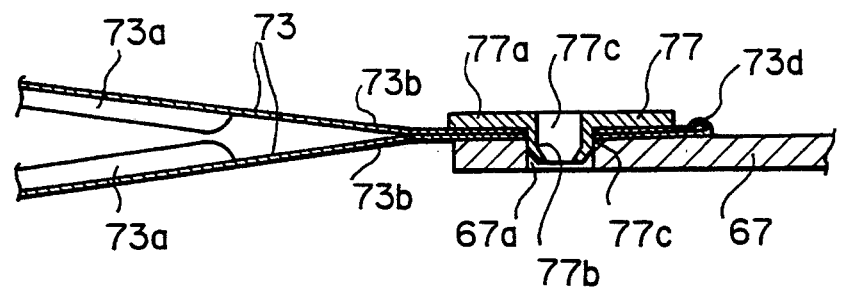
FIG. 8 is a cross-sectional view of the magnetic assembly according to the third embodiment.

FIG. 8 shows the magnetic assembly 70 according to the third embodiment of the present invention. This embodiment includes elements identical to those of the previous embodiment, except that spring arms 73 have inner ends 73d at the extremity of the proximal end portions, respectively. The inner ends 73d of the spring arms 73 are integrally connected to each other.

Figure 9:
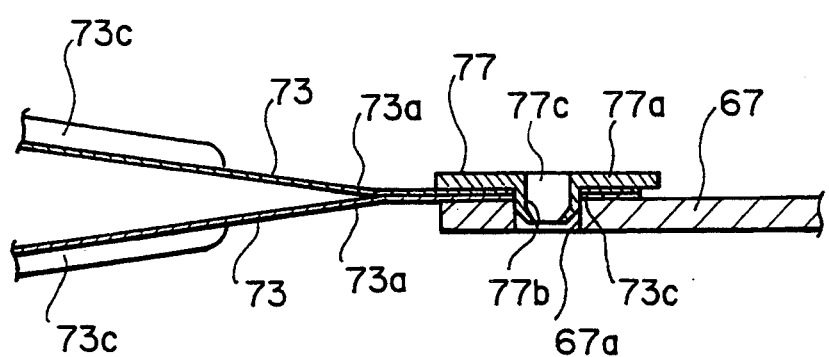
FIG. 9 is a cross-sectional view of the magnetic assembly according to the fourth embodiment.

FIG. 9 shows the magnetic assembly 70 according to the fourth embodiment of the present invention. This embodiment includes elements identical to those of the previous embodiment, except that spring arms 73 have side flaps 73c bent outside the two spring arms 73, while the side flaps 73a in the previous embodiment is bent inside the two spring arms 73.

I claim:

1. A magnetic head assembly in a magnetic disk apparatus comprising a plurality of coaxially arranged magnetic disks, with one of the adjacent magnetic disks having a first surface and the other disk having a second surface facing the first surface; said magnetic head assembly comprising:

first and second magnetic heads:

a first spring arm having first and second opposite flat end portions; the first spring arm carrying, at the first end portion thereof, the first magnetic head for access to the first surface of the magnetic disks;

a second spring arm having first and second opposite flat end portions; the second spring arm carrying, at the first end portion thereof, the second magnetic head for access to the second surface of the other magnetic disk;

a head arm extending from a rotatable support structure into a gap between the adjacent magnetic disks for supporting the first and second spring arms at the second opposite flat end portions for radial movement relative to the magnetic disks; and a unitary holder having means for holding the second flat end portions of the first and second spring arms together so as to abut between one side of the head arm and the unitary holder; the unitary holder having an engaging portion extending through the first and second flat spring arm end portion and contacting the head arm; the engaging portion being permanently deformed to bite into the head arm and fix the unitary holder and second flat opposite end portions to the head arm, with the second flat opposite end portions fixed between the unitary holder and head arm.

2. A magnetic head assembly according to claim 1, wherein the unitary holder comprises a flat plate portion and at least one cylindrical engaging portion extending perpendicularly from the flat plate portion; the first and second spring arms having apertures for passage of the cylindrical engaging portion; the head arm having a hole delimited by a cylindrical inner wall, whereby the cylindrical engaging portion of the holder is inserted through the apertures of the first and second spring arms, received in the hole of the head arm, and permanently deformed to bite into the cylindrical inner wall of the head arm.

3. A magnetic head assembly according to claim 2, wherein the cylindrical engaging portion has a bore having an inner diameter, and the cylindrical engaging portion is permanently deformed by forcibly inserting a rigid ball, having a diameter slightly larger than the inner diameter of the bore of the cylindrical engaging portion, through the internal hole of the cylindrical engaging portion to cause permanent deformation to the cylindrical engaging portion.

4. A magnetic head assembly according to claim 3,
    said one side of said head arm having a flat surface extending from said rotatable support structure, said hole penetrating said flat surface; and wherein
    said unitary holder holds the second end portions of the first and second spring arms between said flat surface and said unitary holder.

5. A magnetic head assembly according to claim 1, wherein the first and second spring arms are leaf springs having side flaps, respectively; the side flaps being bent inside the first and second spring arms.

6. A magnetic head assembly according to claim 1, wherein the first and second spring arms are leaf springs having side flaps, respectively; the side flaps being bent outside the first and second spring arms.

7. A magnetic head assembly according to claim 1, wherein the first and second spring arms have inner ends at the extremity of the second end portions, respectively; the inner ends of the first and second spring arms being integrally connected to each other.

8. A magnetic head assembly according to claim 1,
    said one side of said head arm having a flat surface extending from said rotatable support structure; and wherein
    said unitary holder holds the second end portions of the first and second spring arms between said flat surface and said unitary holder.

\* \* \* \* \*